May 22, 1962 — J. A. F. GERRARD ETAL — 3,035,771

APPARATUS FOR SIMULATING GEOPHYSICAL PHENOMENA

Filed Sept. 20, 1956 — 4 Sheets-Sheet 1

INVENTORS
JOHN A. F. GERRARD
and HARLAN K. REYNOLDS

BY Stevens, Davis, Miller & Mosher
ATTORNEYS

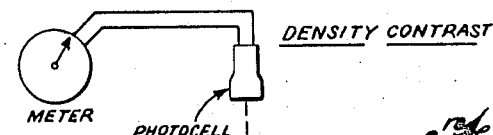
Fig. 4.
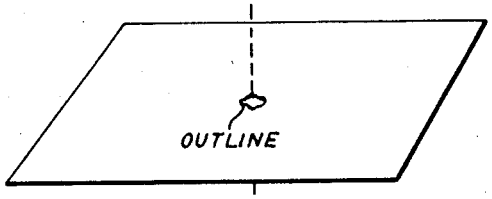
Fig. 5.
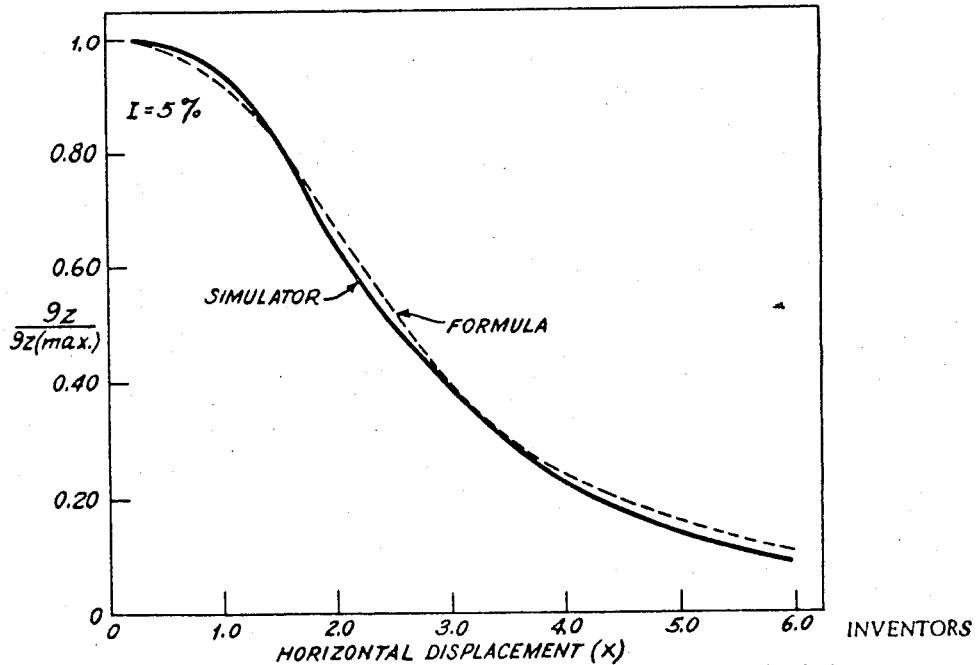

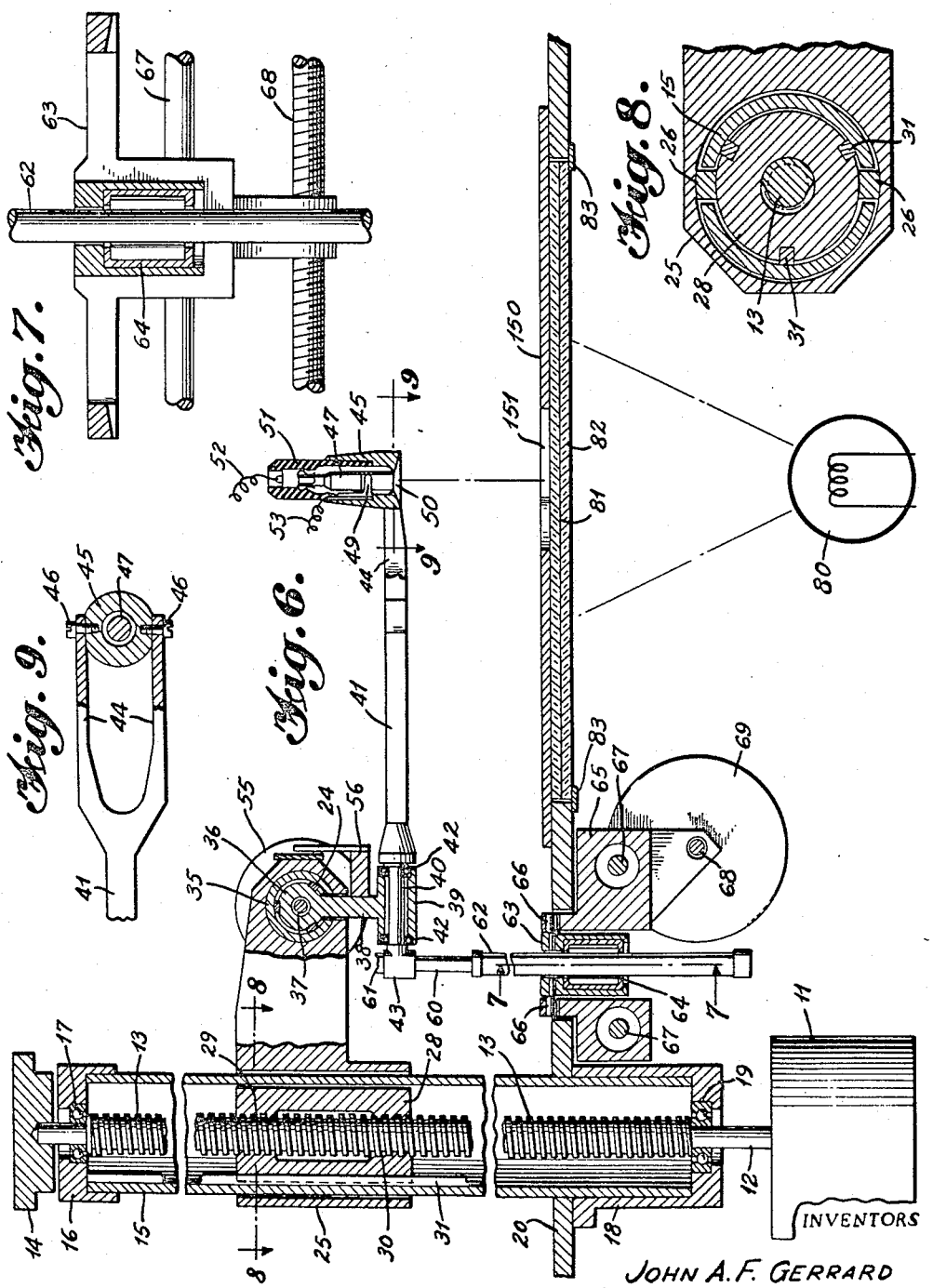

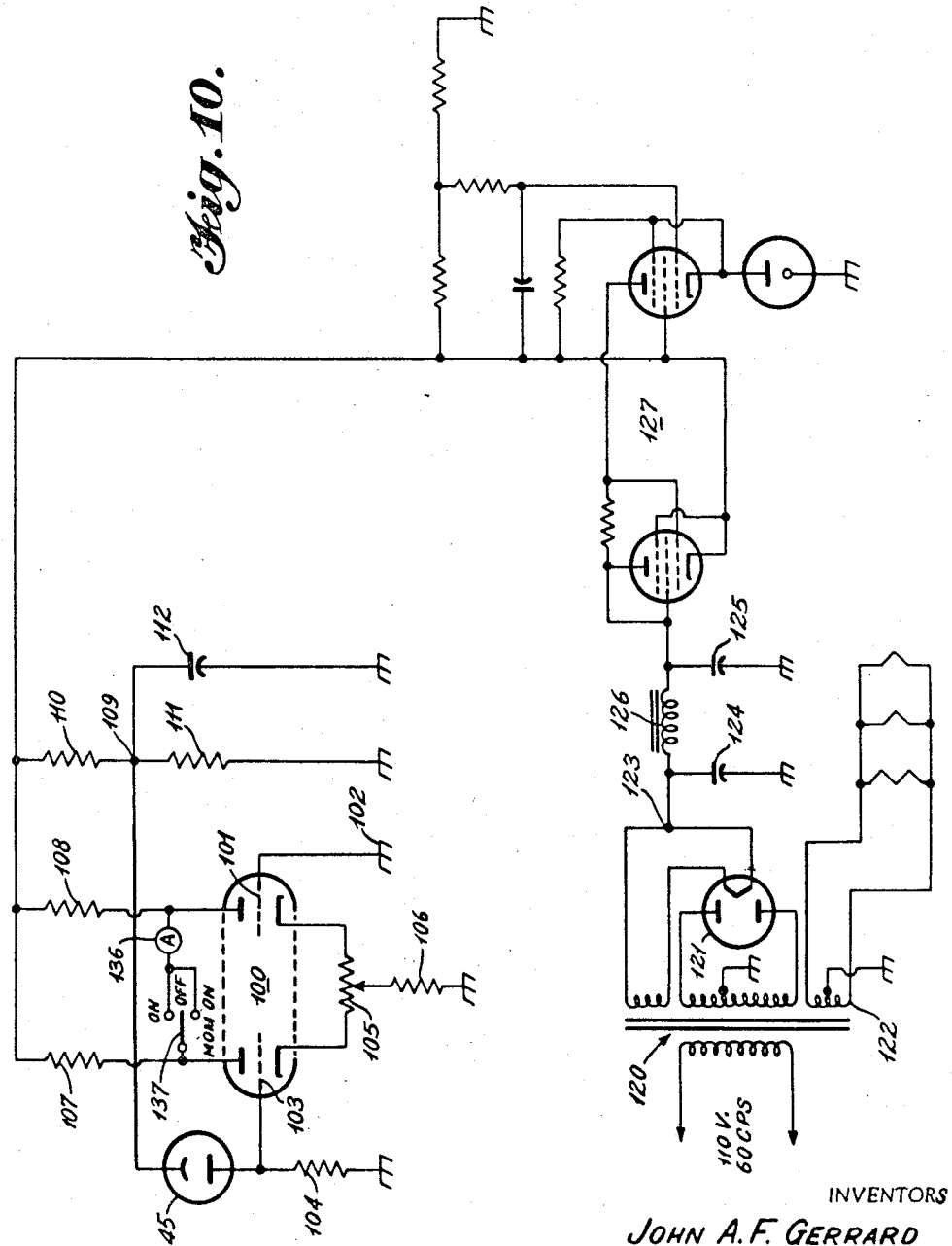

United States Patent Office 3,035,771
Patented May 22, 1962

3,035,771
APPARATUS FOR SIMULATING GEOPHYSICAL PHENOMENA
John A. F. Gerrard, Dallas, and Harlan Kendall Reynolds, Houston, Tex., assignors to Texas Instruments Incorporated, Dallas, Tex., a corporation of Delaware
Filed Sept. 20, 1956, Ser. No. 611,054
7 Claims. (Cl. 235—184)

This invention relates to a method and apparatus for simulating geophysical phenomena and more particularly to a method and apparatus for simulating a gravity anomaly whereby the computation of a gravity equation with respect to a subsurface body can be greatly expedited.

In geophysical prospecting the determination of gravity anomalies is of value in determining the presence of ore bodies, petroleum deposits and other formations in the earth's subsurface. By gravity anomaly is meant any departure from the normal gravitational field of the earth which is produced by an abnormal density distribution within the earth. It will be appreciated that such anomalies may be of large areal extent such as those associated with a major geological feature like a mountain range, an ocean deep, or a rift valley. Features of this type would produce an anomaly of considerable magnitude. On the other hand, the anomaly may be associated with a small fault or ore body and have a value quite small.

In the exploration work relating to the discovery of petroleum and ore deposits, interest is concerned mainly with small anomalies such as may be produced by a low density salt dome intruding through higher density sediments, a fault displacing strata, a dyke or a high density ore body lying in lower density material, etc.

If features of this type are traversed with a gravity meter, the measurements will be indicative of a gravity anomaly and from this anomaly efforts can be made to determine the depth and form of the feature producing the anomaly. It is unfortunate, however, that it is not possible to determine definitively the depth and form of the feature from the simple gravity anomaly as two or more different subsurface bodies can produce similar anomalies at the surface of the earth. Once the problem has been resolved to a selection of a few different possible subsurface bodies it remains for an experienced geologist to determine which of the possible subsurface configurations is most likely to be present.

The selection of likely subsurface bodies that would produce a particular gravity anomaly is accomplished by trial and error plus whatever experience there is available. Once the various configurations have been selected it is then necessary to compute the gravity effects of the several possibilities. These computations are exceedingly tedious and time-consuming unless the problem is greatly oversimplified to the point where the results have little or no geological significance. In order to alleviate the time problem involved in the calculations, a number of nomograms, dot charts, graticles and other devices have been employed but generally these can be utilized only with respect to two-dimensional cases. It was in an endeavor to overcome these limitations that the gravity anomaly simulator of the present invention was devised.

By the present invention there is provided an apparatus to be utilized in geophysical prospecting that will function to simulate a gravity anomaly in an expedient manner. By employing the apparatus of the invention the necessity for engaging in tedious and time-consuming computations is completely avoided. The applications of the present invention include a rapid calculation of the gravity anomaly that would be produced starting with a possible subsurface body and also simulating a measured gravity anomaly by aiding in the selection of the proper subsurface bodies that would produce the measured gravity anomaly. The apparatus of the present invention makes it possible to produce data in a relatively short time that would otherwise require much longer to produce by conventional calculating methods presently employed.

The above is accomplished by the present invention by an apparatus which is designed to function according to Lambert's cosine $\theta$ law, which determines the light value for a horizontal layer. It has been discovered that the gravity equation can be transformed into an analog which mathematically exactly relates to Lambert's cosine $\theta$ law. The gravity equation for an area including an irregularly shaped figure located in the subsurface and having a density differing from that of its homogeneous surroundings by an amount $\Delta\rho$ (rho) is represented by the following equation:

$$g_z = \gamma \cdot \Delta\rho \int dz \int \frac{Z}{r^3} dx \cdot dy$$

In the above equation the vertical component of gravity at a point on the surface of the ground is being determined. The particular point selected is taken as the origin of the cartesian coordinates and the consideration is of the effects of an element of volume $dx\, dy\, dz$ located at $x$, $y$ and $z$ where $dx$ and $dy$ are the horizontal dimensions and $dz$ is its thickness in the vertical direction. The formula represented above is the integral of the effects of all such elements in the body.

Now if an approximation is made by dividing the body into a plurality of horizontal layers of finite thickness $\Delta z$ then the contribution of any one of the layers to the vertical component of gravity can be expressed as:

$$g_z = \gamma \cdot \Delta\rho \cdot \Delta z \cdot z \int \frac{1}{r^3} dx \cdot dy$$

The total value of $g_z$ at a selected point is equal to the sum of $g_z$ for all the layers.

The last equation has an exact analogy with Lambert's law which can be represented by the following equation:

$$L = K \int \frac{Z}{r^3} dx \cdot dy$$

L is the illumination at a point a vertical distance Z above an illuminated surface due to a small area $dx\, dy$ on the surface and K is a constant.

The term $r$ in either the gravity or Lambert's law equation represents the separation of an elemental area or volume from the point at which the measurement is being made.

Accordingly, it is an object of the present invention to provide a method and apparatus for use in geophysical prospecting which is capable of simulating the gravity anomaly that would be produced by a subsurface body of arbitrary shape in an expedient and rapid manner to relieve the necessity for engaging in tedious and time-consuming calculations which would otherwise slow down the entire operations.

It is a further object of the present invention to provide a novel form of apparatus functioning under scientific principles analogous to those employed in the calculation of a gravity anomaly which apparatus is simple in design but exceedingly efficient in operation.

It is a still further object of the present invention to provide a novel method for determining gravity anomalies which can be carried out rapidly and efficiently.

Other and further objects of the present invention will become apparent from the following detailed description of a preferred embodiment of the present invention when taken in conjunction with the appended drawings in which:

FIGURE 4 is a schematic view illustrating the manner in which the density factor is introduced into the gravity anomaly calculation;

FIGURE 5 is a plot of the gravity anomaly produced by the body shown in FIGURE 2 and graphically portraying the anomaly as calculated from the gravity equation and as produced by the apparatus of the present invention;

FIGURE 6 is a view in section on the mid plane of the apparatus as illustrated in FIGURE 1;

FIGURE 7 is a view in section of FIGURE 6 taken along line 7—7;

FIGURE 8 is a view in section of FIGURE 6 taken along line 8—8;

FIGURE 9 is a view in section of FIGURE 6 taken along line 9—9; and

FIGURE 10 is a schematic representation of the electrical portion of the apparatus.

Figure 1:
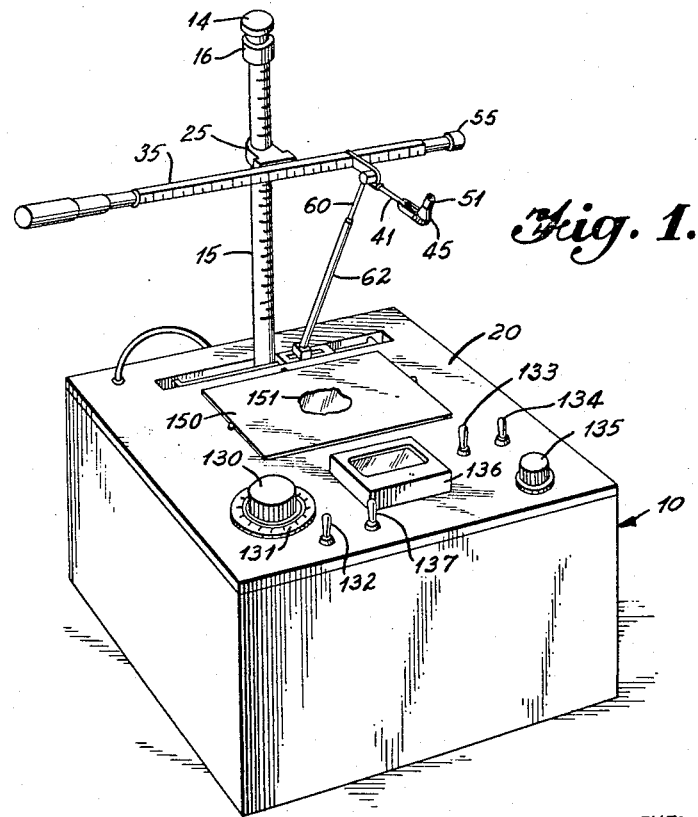
FIGURE 1 is a view in perspective of the device of the present invention.

Referring now to the apparatus in detail and particularly with reference to FIGURES 1 and 6 to 9 inclusive a preferred embodiment will be described. The apparatus includes a box structure generally designated by the numeral 10 which houses a portion of the apparatus and the electrical components required for the proper operation of the apparatus. Mounted within the box-like structure 10 and toward the rear is a vertical drive motor 11 having a vertical drive shaft 12. Fixed to the drive shaft 12 is a vertical drive screw 13 projecting through the top of box 10. Fixed to the top of the vertical drive screw 13 is a vertical drive handwheel 14. The vertical drive screw 13 is received within a vertical drive housing 15. Mounted on the top of the vertical drive housing 15 is a top bearing housing 16. A suitable ball bearing 17 is retained by the bearing housing 16 in engagement with the top end of the vertical drive screw 13 whereby relative rotation between the drive screw 13 and the bearing housing 16 is made possible. A bottom bearing housing 18 is mounted on to the lower end of the drive housing 15 and retains a ball bearing 19 in engagement with the lower end of the drive screw 13 whereby relative rotation at this point is also possible. The drive housing 15 projects through top plate 20 of the box-like structure 10 and the bottom bearing housing 18 is fixed to the under-surface of the top plate 20.

Slidably engaged with the vertical drive housing 15 is a horizontal drive bracket 25 composed of an annular portion and a bracket arm portion. The annular portion of bracket 25 fits around the drive housing 15 which is axially slotted at two places at opposite ends of a diameter. A pair of spacers 26 are fixed to the inner surface of the annular portion of the bracket 25 and lie within the slots defined by the drive housing 15. Within the drive housing 15 is located a vertically driven carriage 28 threadedly engaged with the drive screw 13 at its upper and lower ends as indicated by the numerals 29 and 30, respectively. The spacers 26 are integrally attached to the outer surface vertical carriage 28 whereby the carriage 28 when moved axially will carry with it the horizontal drive bracket 25. Attached to the inner surface of the vertical housing 15 at three equally spaced positions are keys 31 which are received in suitable slots cut, milled or otherwise formed in the external surface of the vertical carriage 28. This forms an expedient means for restraining the carriage 28 against rotation when the vertical screw 13 is driven.

The horizontal drive bracket 25 projects normally away from the vertical housing 15 as appears in FIGURE 6. Received in the free end of the bracket 25 is a horizontal drive housing 35 in the form of a tube which is axially slotted on its lower side. The bracket 25 likewise defines a slot in registry with the axial slot of the horizontal drive housing 35. Received within the horizontal drive housing 35 is a horizontal carriage 36 defining a threaded center bore in which is received horizontal drive screw 37. Three keys 24 are integrally formed or attached to the inner surface of the horizontal drive housing 35 at equally spaced positions and are received in slots cut, milled or otherwise formed in the exterior surface of the horizontal carriage 36. The horizontal drive screw 37 lies within the housing 35 and extends substantially normal to the axis of the vertical drive screw 13 whereby it is possible to achieve rectilinear motion of the horizontal carriage 36 in two directions at right angles to each other. A motor 55 is mounted on the housing 35 drivingly connected to the screw 37. Integrally attached to the horizontal carriage 36 is a short arm 38 which projects through the aligned slots defined by the horizontal drive housing 35 and the horizontal drive bracket 25. Fixed to the end of the arm 38 is a sleeve 39. Received within the sleeve 39 is a reduced section 40 of a support arm 41. Bearings 42 are provided to permit relative rotation between the sleeve 39 and the reduced section 40. Fixedly attached to one end of the reduced section 40 is a collar 43 to prevent longitudinal motion of the support arm 41. The support arm 41 forming the continuation of the other end of the reduced section 40 terminates in a bifurcated portion and has mounted between the two legs 44 thereof a photoelectric cell housing 45. The precise mounting is achieved by means of pivot screws 46 which engage with the photoelectric cell housing 45 to support it pivotally on the arms 44.

The photoelectric cell 47 is suitably mounted in the photocell housing 45 by means of a spring clip 49 with its sensitive surface 50 facing downwardly. The top of the assembly is closed by an insulator cap 51. The wires 52 and 53 represent the electrical leads to the photoelectrical cell unit 47.

Received through the collar 43 is an arm 60 which is held fixed to the collar 43 by means of screws 61. The arm 60 is telescopingly received with a sleeve 62 which in turn is received through a radius rod bearing housing 63. Contained within the housing 63 and engaging with the sleeve 62 is a radius rod linear bearing 64. The housing 63 is pivotally supported from a radius rod carriage 65 by means of needle bearings 66 contained in the carriage 65 and which are received in the bearing housing 63. The carriage 65 is slidably mounted on a pair of carriage rods 67 and also has a bracket portion which threadably engages with a carriage drive screw 68 driven by a carriage drive motor 69. The top plate 20 is slotted across its back portion as will appear in FIGURE 1 to enable the carriage 65 to be shifted coaxially with respect to the horizontal carriage 36.

Contained within the box-like structure 10 at a point substantially below the photoelectric cell 47 and spaced from the top plate 20 is a light source 80. The top plate 20 defines a substantial cut-out and fitted wherein are two sheets 81 and 82 of flashed white glass. Strips 83 attached to the under-surface of the plate 20 constitute a marginal support for the sheets 81 and 82.

Both the housings 15 and 35 are marked with graduated scales to assist in the orientation of the carriages 28 and 36 with reference to the plates 81 and 82. An indicator arm and pointer 56 is attached to the arm 38 to read against the scale on the housing 35.

Referring now to FIGURE 10 the electrical component of the apparatus will be described. There is illustrated a duo triode 100 connected as a differential amplifier with one grid 101 connected to ground as indicated by the reference numeral 102 and its other grid 103 being fed by the photoelectric cell 47 across the resistor 104. The two cathodes are tied together through a variable resistor or rheostat 105 which is tied to ground through a resistor 106. The plate load resistors for the two sections of the triode are indicated by the numerals 107 and 108. The photoelectric cell 47 is connected by a lead to terminal 109 to which is also connected to one end of a load resistor 110 and a resistance capacitance circuit comprised of a resistor 111 and condenser 112 both tied to ground. The B+ or plate supply for the tubes is obtained from a 110 volt 60 cycle alternating current source. The input voltage is applied across a transformer generally designated as 120 to a duo diode 121 connected in push-pull to give full-wave rectification. A step-down secondary winding of the transformer 120 supplies the necessary voltage to heat the filaments of the various tubes employed. This step-down winding is generally designated by the numeral 122. The output of the full-wave rectification appears at terminal 123 and is sent through a suitable filtering circuit comprised of condensers 124 and 125 and choke coil 126. The output from the filter circuit is then passed through a suitable circuit generally designated by the numeral 127, which includes a pair of pentodes and a neon glow lamp together with the necessary adjuncts connected together as a voltage regulation circuit. It will be appreciated that other forms of voltage regulation may be employed. The output from the voltage regulator circuit is utilized as the plate supply for the duo triode 100 and the photoelectric cell 47.

The rheostat or variable resistor 105 is controlled by a knob mounted on the top plate 20. This knob is designated by the numeral 130 and is indexed against a suitable scale 131 likewise mounted on the top plate 20. There is also provided a main power switch 132, a switch 133 for controlling the operation of the vertical drive motor 11, a switch 134 for controlling the operation of the carriage drive motor 69 and a knob 135 for controlling the operation of the horizontal drive motor 55. A meter is also provided designated by the numeral 136 and is connected in the electrical circuit across the plates of the duo triode. A switch 137 is further provided as a control for the meter 136.

Having described in detail the structure of the apparatus of the present invention there will now follow a discussion of the operation of the apparatus and of the method of the present invention. After having decided upon the shape of a subsurface body and having selected the various trail parameters it is possible to calculate the gravity anomaly that will be produced under the circumstances. First, it is desirable to determine the relative weight of each layer of the selected body. It will be recalled that in the use of the apparatus it is necessary to divide the body undergoing study into a plurality of horizontal layers. Each layer is then reproduced in the form of a mask or outline having a cut-out portion corresponding in configuration to that of the particular layer. Such a mask is shown in FIGURE 1 and is designated with the reference numeral 150 with the cut-out being designated by the numeral 151. With one of the masks in place on the flashed white glass plates 81 and 82, the vertical carriage is moved until the photoelectric cell 47 bears the proper depth relation to the layer outlined, that is, the cell 47 is spaced above the layer a distance corresponding to the depth of the layer below the earth's surface. The photoelectric cell 47 is positioned along the horizontal drive screw until it is located at the point nearest the center of the layer. Then, with the light at a convenient setting a reading is taken and, when multiplied by the thickness of the selected layer, there will result the weight of the layer. With the light at this same setting this procedure is repeated for each layer and in this fashion the relative weight of each layer is obtained.

Next it is necessary to simulate the field gravity survey traverses by positioning the photoelectric cell at various points across the particular layer being studied. This is accomplished by moving the horizontal carriage until the photoelectric cell 47 is centered over the layer. Thereafter light values are measured and recorded at a plurality of points as the photoelectric cell 47 and horizontal carriage are moved to either side of the center position of the layer. It is significant in these measurements that while over the layer, the photoelectric cell must be faced vertically downward, that is, toward the nearest point on the illuminated surface. This is achieved by means of the carriage drive motor and related apparatus which are controlled by a pair of limit switches to retain the photoelectric cell 47 pointing vertically downward. Should the photoelectric cell 47 begin to tilt, a limit switch will be contacted by the sleeve 62 which will cause the carriage motor 69 to drive the carriage 65 in the same direction as the photoelectric cell 47 so that it will be returned to a vertical position. When photoelectric cell 47 reaches a point directly over the outlined edge of the layer, switch 134 is operated to remove the power from carriage motor 69. Thus, as photoelectric cell 47 traverses on outwardly from the edge of the layer, arm 60 causes cell 47 to deflect from the vertical and point at the nearest portion of the layer.

Figure 3:
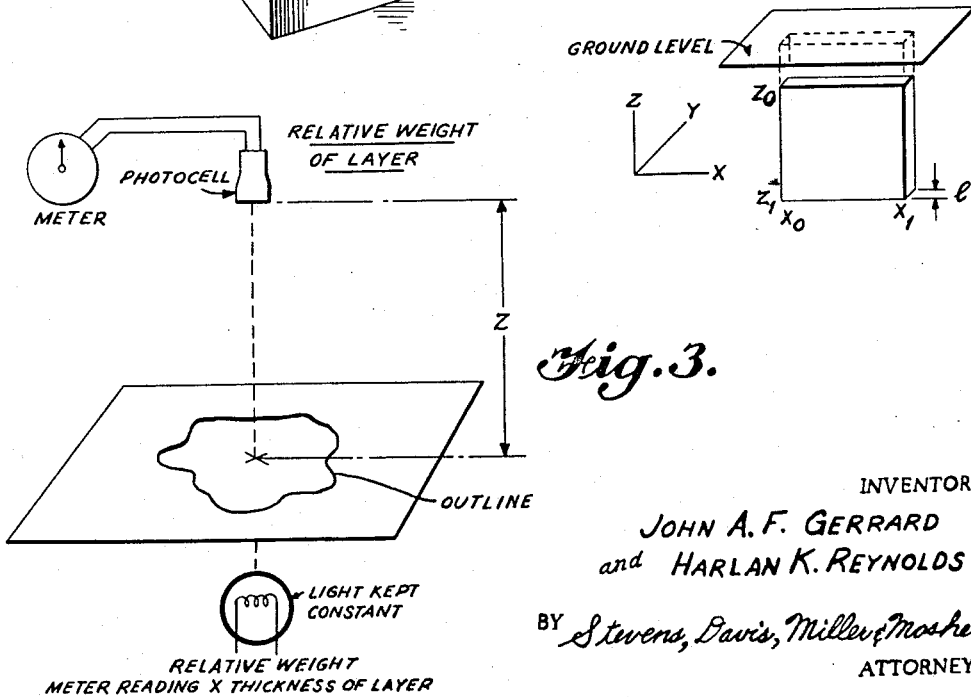
FIGURE 3 is a schematic representation of the technique employed for determining the relative weight of a layer of a subsurface body.

The values obtained during a traverse of the layer are multiplied by the weight for the particular layer. The procedure is repeated with each of the several layers and the values obtained for each point, after being multiplied by the weight for the layer, are summed to give the relative value of the gravitational anomaly at this point. This permits comparison with the field observations but it will be necessary to introduce into the results obtained by the apparatus a multiplicative constant. The setup for determining the relative weight of each layer and also the value of the gravitational anomaly at each of several points of a layer is shown in FIGURE 3.

To determine the appropriate density contrast it is necessary to first assume a density value. Thereafter the photoelectric cell is set at the proper level for one of the layers with the cell positioned centrally with respect to the layer. A small circular outline is then positioned on the flashed white glass plates 81 and 82. The circular outline is made small enough so that the body it represents can be taken as approximately a point source. The light value measured by the photoelectric cell 47 is then recorded. The gravitational anomaly of the small body represented by the circular outline is calculated considering the body as having unit thickness. The ratio of the calculated value to the measured value times the reading at each point will then give the actual gravitational anomaly for each point for the assumed shape and assumed density contrast. By separately calculating each of the layers in the above fashion the problem can be set up with variable density contrast. There is shown schematically in FIGURE 4 the set up used in a determination of the appropriate density contrast.

Figure 2:
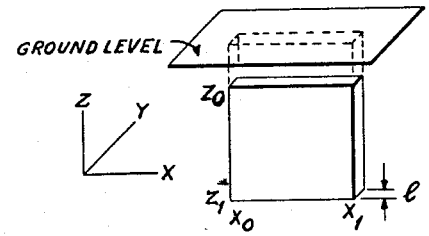
FIGURE 2 is a schematic representation of a particular configuration for a subsurface body.

In FIGURE 2 there is shown a body of regular configuration located in a predetermined position with reference to ground level. In FIGURE 5 there is illustrated the curve of the gravity anomaly produced using the gravity equation and calculating the anomaly. This curve is shown in dotted line. The operation of the apparatus of the present invention produced a curve of the anomaly as shown in solid line for the formation of FIGURE 2. It will be seen that by the apparatus of the present invention the tedium of computing the gravity anomaly associated with a subsurface body is completely avoided. The apparatus of the present invention solves the particular problem to an accuracy of 5%. With the apparatus of the invention capable of achieving accuracy of 5%, in a fraction of the time required for manual computation, it is believed that geophysicists will be greatly encouraged to compute many more theoretical anomalies for use in comparison with practical gravity anomalies which have been measured in the field.

Although the present invention has been shown and described with reference to a referenced embodiment, nevertheless, various changes and modifications that would be obvious to those skilled in this art from a knowledge of the teachings of the present invention are deemed to be within the scope and contemplation of the invention.

What is claimed is:

1. An apparatus for simulating a gravity anomaly comprising a box-like structure, a translucent plate mounted in one surface of said structure, a light source positioned within said structure adapted to illuminate said plate, light detection means positioned outside said structure spaced from said plate, means for moving said light detection means towards and away from said plate and in a plane parallel to said plate and metering means for determining the intensity of light detected by said light detection means.

2. An apparatus for simulating a gravity anomaly comprising a box-like structure, a translucent plate mounted in one surface of said structure, a light source positioned within said structure adapted to illuminate said plate, light detection means positioned outside said structure spaced from said plate, means for moving said light detection means towards and away from said plate, means for moving said light detection means in a plane parallel to said plate and metering means for determining the intensity of light detected by said light detection means.

3. An apparatus for simulating a gravity anomaly comprising a box-like structure, a translucent plate mounted in one surface of said structure, a light source positioned within said structure adapted to illuminate said plate, an elongated means mounted at one end to said box-like structure and projecting normally away from said plate, a carriage means mounted on said elongated means adapted to move coaxially relative to said elongated means, elongated cross arm means mounted to said carriage means, second carriage means mounted on said cross arm means adapted to move coaxially relative to said cross arm means, light detection means carried by said second carriage means and metering means for determining the intensity of light detected by said light detection means.

4. Apparatus as defined in claim 3 wherein a support member is rotatably carried by said second carriage means, said light detection means is carried by said support member and telescoping means is attached to said support member to control the relative rotation of said support member with respect to said second carriage means.

5. An apparatus for simulating a gravity anomaly comprising a box-like structure, a translucent plate mounted in one surface of said structure, a light source positioned within said structure adapted to illuminate said plate, a first lead screw mounted at one end to said structure and extending normally away from said plate, a carriage threadedly engaged with said lead screw, a second lead screw mounted on said carriage normal to said first-mentioned lead screw, a second carriage threadedly engaged with said second lead screw, light detection means positioned on said second carriage and metering means for determining the intensity of light detected by said light detection means.

6. Apparatus as defined in claim 5 wherein a support arm is rotatably supported by said second carriage, said light detection means is mounted on said support arm, and telescoping means is attached to said support arm to control the relative rotation of said support arm with respect to said second carriage.

7. An apparatus for simulating a gravity anomaly comprising a box, a translucent plate mounted in the top of said box, a light source in said box, a vertical housing extending from within said box to a point above the top of said box, a lead screw bearing supported in said housing, a motor operatively connected to drive said lead screw, a first carriage threadedly engaged with said lead screw, a bracket attached to said first carriage, a horizontal housing defining an axial slot carried by said bracket, a second lead screw bearing supported in said second housing, a second motor operatively connected to drive said second lead screw, a second carriage threadedly engaged with said second lead screw, an extension fixed to said second carriage and projecting through said slot, a support arm terminating in a bifurcated portion rotatably mounted on said extension, a photoelectric cell mounted on said bifurcated portion, a radius rod connected to said support arm, a sleeve telescopingly receiving said radius rod, a third carriage, means pivotally mounting said sleeve in said third carriage, said third carriage being slidably received in a slot extending parallel to said horizontal housing defined in the top of said box, a third lead screw threadedly engaged with said third carriage and a motor operatively connected to drive said third lead screws.

References Cited in the file of this patent
UNITED STATES PATENTS 2,410,550     Padva _____ Nov. 5, 1946
2,787,417     Northrup et al. _____ Apr. 2, 1957